W. P. COX.
ANIMAL TRAP.
No. 186,806.　　　　　Patented Jan. 30, 1877.
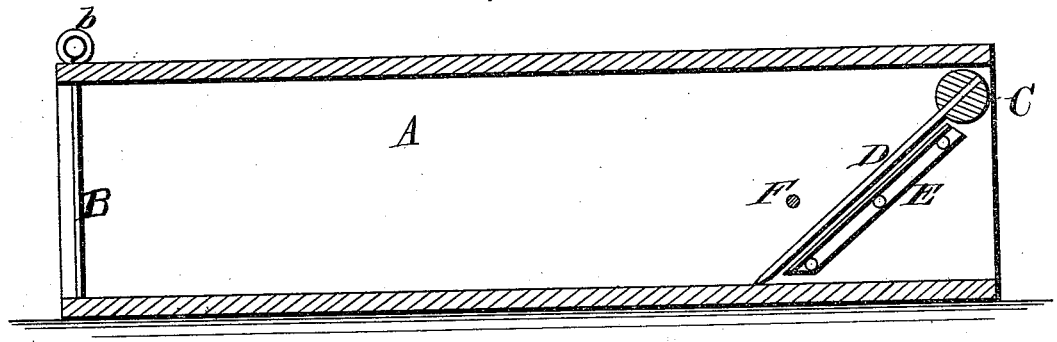
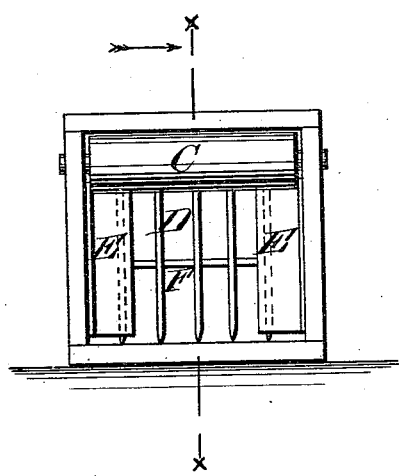
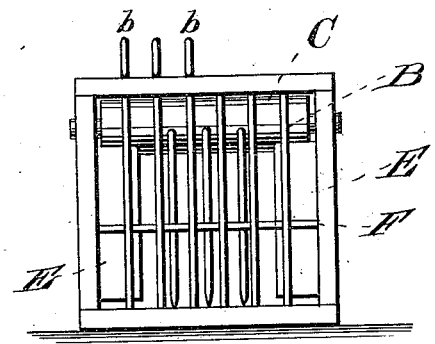
WITNESSES　　　　　　　　　　　　　　INVENTOR.

UNITED STATES PATENT OFFICE.

WILLIAM P. COX, OF ACADEMY, NEW YORK.

IMPROVEMENT IN ANIMAL-TRAPS.

Specification forming part of Letters Patent No. 186,806, dated January 30, 1877; application filed December 23, 1876.

*To all whom it may concern:*

Be it known that I, WILLIAM P. COX, of Academy, in the county of Ontario and State of New York, have invented a new and valuable Improvement in Animal-Traps; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my animal-trap, and Fig. 2 is a front view thereof. Fig. 3 is a rear view of the same.

This invention relates to traps for catching animals; and it consists mainly in the construction and application of certain inclined guard-plates, which permanently close the sides of the entrance; also, in the employment of a transverse inner stop-bar, which prevents the pivoted entrance-grating or wire door from being raised by a captured animal in its efforts to escape.

In the annexed drawings, A designates the rectangular box or casing of my trap, and B designates a series of vertical bars closing the rear end of the same. Several of these bars (marked $b$) are made detachable, and extended above the top of said box or casing to facilitate their removal. This construction allows the convenient introduction of bait within the said trap, or the withdrawal of the game after it is captured.

In the mouth or front end of said box or casing A, and at the top thereof, is journaled a short strong rock-shaft, C, which is provided with a series of inwardly-inclined bars, D. The free ends of said bars are pointed, and their sides are guarded by two inclined guard-plates, E, rigidly secured to the sides of casing A. These guard-plates prevent a captured animal from escaping, by working between the side of the casing and the inclined bar D nearest thereto. Said plates also brace said bars D, and prevent them from being bent outward. F designates a cross-bar or stop-bar arranged transversely above and behind the said inwardly-inclined bars D, so as to prevent the same from being raised more than a certain distance. When raised thus far the animal can enter by passing under the points of said bars, which points are presented away from him, but on attempting to pass outward and thus escape, the said animal encounters the said points as soon as it raises the said bars D, and the said stop-bar F prevents them from being raised high enough to permit exit. Said bars B, $b$, D, and F are all constructed of metal, and their size corresponds to the strength of the animal for which said trap is designed.

For small animals, like mice, wire will suffice. Stop-bar F may be discarded without rendering the device inoperative, as many animals would not attempt to raise the door-bars D from the inside. Said bars may also be made so heavy as to render such opening impracticable.

What I claim as new, and desire to secure by Letters Patent, is—

1. The combination of rock-shaft C, inclined guard-plates E, rigidly secured to the casing A, and inclined door-bars D, substantially as set forth.

2. The combination of rock-shaft C, inclined door-bars D, guard-plates E, and stop-bar F, substantially as set forth.

In testimony that I claim the above I have hereunto subscribed my name in the presence of two witnesses.

WILLIAM PARKENSON COX.

Witnesses:
  JOHN Q. JOHNSON,
  HIRAM METCALF.